Nov. 2, 1926.  1,605,884
T. S. WILKINSON
SPEEDOMETER
Filed Jan. 20, 1925   2 Sheets-Sheet 1
Fig. 1.
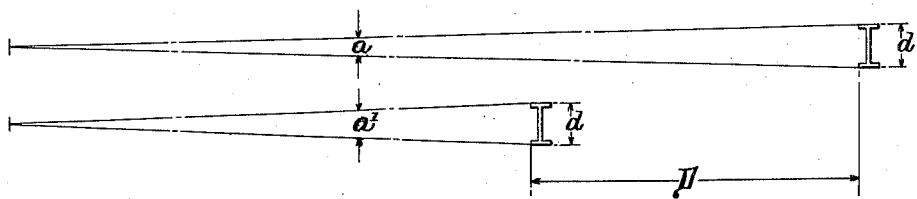
Fig. 2.
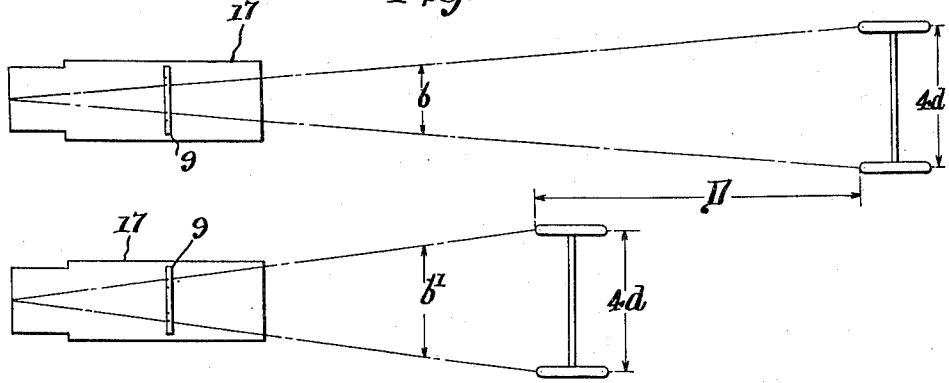
Fig. 3. Fig. 4.
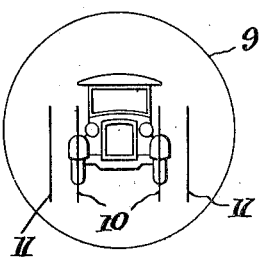 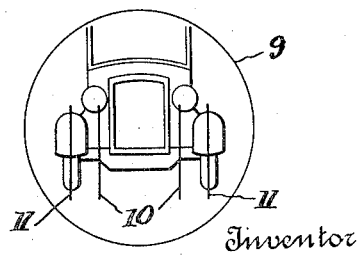
Inventor
T. S. Wilkinson
by Wilkinson & Giusta
Attorneys.

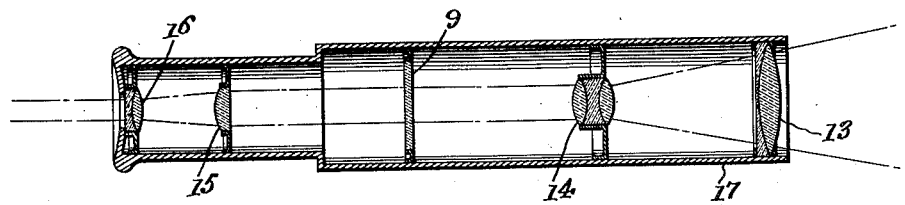
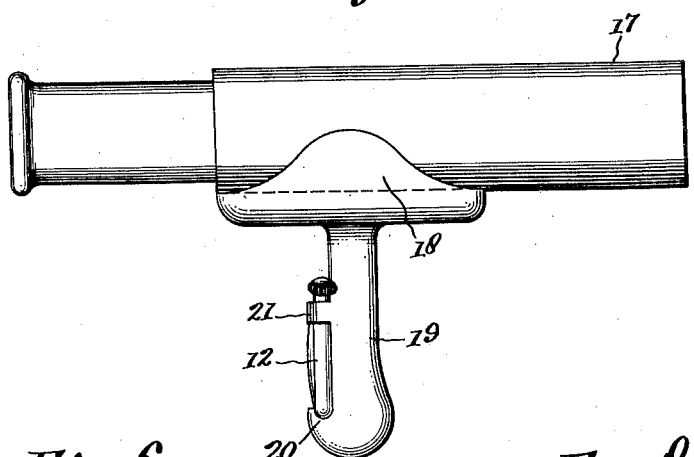
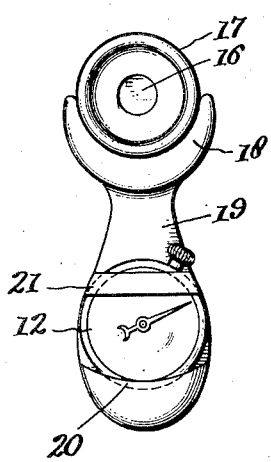
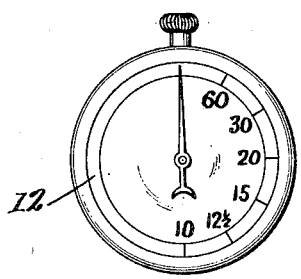

Patented Nov. 2, 1926.

1,605,884

UNITED STATES PATENT OFFICE.

THEODORE STARK WILKINSON, OF WASHINGTON, DISTRICT OF COLUMBIA.

SPEEDOMETER.

Application filed January 20, 1925. Serial No. 3,699.

The present invention relates to improvements in speedometers.

Under present conditions, the only method in use for the detection of offenders against automobile speed laws consists in following the speeder and, by reading a speedometer on the pursuing vehicle, thereby observing his actual speed. An intentional offender against speed laws is ordinarily on the alert for traffic policemen and, when he sees one ahead, will slow down so that, by the time the policeman has taken up the chase, the driver is proceeding at a legal rate. Too often, the policemen, by observation of the approaching car is morally certain that the speed limit is being exceeded, but this observation by eye and judgment is not accepted as evidence in a court of law.

This invention supplies a means of detecting the speed of an approaching or receding automobile with sufficient accuracy to fix definitely such speed and to furnish positive evidence, adequate for legal purposes. The invention consists in a means of measuring the distance of an approaching automobile at two successive points and a means of timing the interval during which the automobile has passed from the farther point to the nearer. Obviously, dividing the distance traveled by the automobile by the time necessary to perform such travel, the rate of such travel or the actual mean speed of the automobile between the two points can readily be found.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a diagrammatic view illustrating the principle involved.

Figure 2 is also a diagrammatic view showing the method of plotting the indicating lines on the glass.

Figure 3 is a plan view of the glass showing the vehicle at the initial position.

Figure 4 is a similar view showing the vehicle at the final position.

Figure 5 is a longitudinal section taken through an optical instrument equipped with the indicating glass.

Figure 6 is an end view of the complete device.

Figure 7 is a side elevation of the same, and

Figure 8 is a plan view of the dial of the timing device.

Referring more particularly to the drawings, the invention consists in the joinder of a range or distance finding device and a timing device. The range finding device is an optical instrument which may be constructed as a binocular or preferably as a monocular telescope 17. On a plane surface of glass 9 situated in the focal plane of the telescope are engraved two sets of fine lines 10 and 11. The first set 10 is so placed that, with the given magnification of the telescope, the front wheels of an automobile at a given distance will, as viewed through the telescope, coincide with the lines, see Figure 3. Similarly, the second set of lines 11 is so placed that the front wheels, at a given nearer distance to the observer, will coincide with the lines of this second set. This is shown in Figure 4. The gauge or distance between wheels of all passenger automobiles and most small trucks is constant, being the standard railroad gauge of 4 ft. 8½ in. and consequently these lines can be calculated with accuracy and placed with accuracy for use for all types of automobiles, except for large trucks. The sets of lines are, of course, equally disposed on either side of the central axis of collimation of the telescope. This description is prepared for a telescope; it might equally well be applied to one or both optical systems of a pair of binoculars.

The timing means is an ordinary stop watch 12, which may, however, be additionally or solely graduated to show the speed in miles per hour, (see Figure 8), corresponding to the time observed, and to the actual difference in range or distance between the two observed positions of the approaching automobile, as fixed by the telescope graduations. For instance, if the telescope is so graduated that the first observation is at a distance of 600 ft. and the second at a distance of 160 ft., the distance run between such observations is 440 ft. If the time from the first observation to the second observation is 10 seconds, the automobile has traversed the intervening distance at the mean rate of 44 ft. per second or 30 miles per hour. Similarly, if the time is 5 seconds, the automobile has been developing a mean speed of 60 miles per hour, and, if the time is 15 seconds, the speed is 20 miles per hour. Then, opposite the 5 second marking on the stop watch, might well be placed 60 to indicate the miles per hour; opposite the 10 seconds, 30; and opposite the 15 seconds, 20, etc; as shown on the dial in Figure 8.

The stop watch or timing device may be manufactured in one instrument integral with the telescope, or may be independent therefrom.

Figure 1 shows the principle involved (without the use of an optical instrument). The wheels and front axle of an automobile, of linear measurement $d$, at one distance from the observer subtend an angle, $a$. At a second distance, closer to the observer than the first by the difference D, the angle $a'$ is subtended. Knowing the fixed measurement of the automobile axle and wheels, $d$, distances from the observer may be selected at will and the angles $a$ and $a'$ calculated. Figure 2 shows the application of the principle to an optical instrument, with an assumed magnification of four diameters. The axle and wheel span then appears to the eye to be $4^d$ and at the two distances as in Figure 1 subtend the angles $b$ and $b'$, which can be calculated. Based on such calculations lines may be inscribed, as shown, on a plane surface of glass as indicated in Figures 3 and 4 to coincide with the observed image of the wheels.

The automobile as seen by the observer at the greater distance is shown in Figure 3; at the lesser in Figure 4.

Figure 5 shows a typical optical system, with, from the right, objective lens 13, erecting system 14, the inscribed plane surface 9 in the focal plane, collective lens 15, and eye-piece system 16.

Figure 6 shows a convenient combination of telescope and stop watch in the same instrument, adapted to ready operation and reading of the stop watch. Figure 8 shows a stop watch graduated in miles per hour for a given interobservation distance, D, of 440 ft.

The optical instrument 17 may be carried in the saddle 18 on the upper part of the bracket or support 19 for the stop watch, which may repose on a shoulder or seat 20 projecting from the lower part of the bracket. This seat 20 is preferably recessed to receive the lower part of the stop watch. A strap 21 may be used to hold the stop watch at the upper portion without obscuring the face thereof.

The strap will form a convenient support for the stem of the watch to avoid movement thereof in the holder; and when turned partially side-wise, as shown in Figure 6, the stem is exposed for free operation.

The operation of the invention is as follows. The policeman or other observer by the side of a road or street notes the approach of a rapidly moving automobile. He observes the automobile through the telescope 17 and, when the front wheels coincide with the first or interior set of lines 10, he starts the stop watch 12. He continues to observe the automobile through the telescope and, when the front wheels coincide with the second or exterior set of lines 11, he stops the watch. He then reads from the face of the watch direct, if so graduated, the mean speed of the automobile for the distance traversed; if the watch is not graduated to show miles per hour, he determines the same by reference to a simple table, or by memory of such table. The operation is done so quickly that he is still in a position to halt the automobile by a command or to take up its pursuit immediately.

Similarly the device may be used to gauge the speed of a retreating automobile; in this case the watch is started when the rear wheels coincide with the outer set of lines, and stopped when they coincide with the inner set.

The small angle of view of an observer on the side of the road rather than directly in the path of the automobile will not affect perceptibly the accuracy of the measurement of speed. Simple calculation will show that even when the distance of the observer is as much as 10 ft. to the side of a path of the oncoming automobile, the error in the measurement of the speed in the second reading if made at a distance of 50 ft. or greater, is less than a fraction of a mile and is well within the error of observation of the man operating the stop watch and obviously well within the margin of speed which would be allowed before charging an offender with an excess speed.

This invention, while primarily intended for use with automobiles of the usual gauge or wheel-tread, can be utilized also for vehicles of unusual gauge by making the observations noted and applying thereto a correction easily calculated and reduced to tabular form for the measured gauge of the non-standard vehicle.

The above describes the general principles of the invention. The distances of the second and first points of observation may be varied at will in the preparation of each instrument, subject only to the limited field or other optical features of the telescope. Thus, for use in cities, the distances may be made relatively small to allow for congested traffic conditions and obstructed visibility, together with low legal speeds. Conversely, for country use the distances may be made greater.

It is obvious that various changes and modifications may be made in the details of construction and design of the above specifically described embodiment of this invention without departing from the spirit thereof, such changes and modifications being restricted only by the scope of the following claims.

What is claimed is:—

1. A speedometer comprising a sighting piece having two sets of indicating marks so spaced as to coincide in the field of vision of the piece with selected parts of an approaching object viewed therethrough, which parts are on the object separated by a known distance, the sets thus respectively adapted to coincide with these parts when the object is at different predetermined distances from the point of view, and a stop watch for use with said piece and calibrated to show for the time interval separating the coincidences the speed of approach of the object viewed.

2. A speedometer comprising a telescope having a glass situated in the focal plane of the telescope and provided with a first set of lines to coincide with similar spaced parts of a vehicle at a given distance, and a second set of lines to coincide with the same spaced parts of the vehicle when at a second different distance from the telescope, and controllable means graduated to show the speed of the vehicle corresponding to the time elapsed and to the actual difference in distance between the two observed positions of the vehicle.

3. A speedometer comprising a telescope having a glass situated in the focal plane of the telescope and provided with inner and outer sets of fine lines, each set for coinciding with similar predetermined spaced parts of a vehicle respectively at predetermined different distances of the vehicle from the telescope, and a stop watch graduated to show in miles per hour the speed of the vehicle in moving from one to the other of the observed positions.

THEODORE STARK WILKINSON.